Oct. 28, 1947. R. D. HICKOK 2,429,757
BALANCING MEMBER FOR THE MOVING ELEMENT OF AN INDICATING INSTRUMENT
Filed Nov. 10, 1944
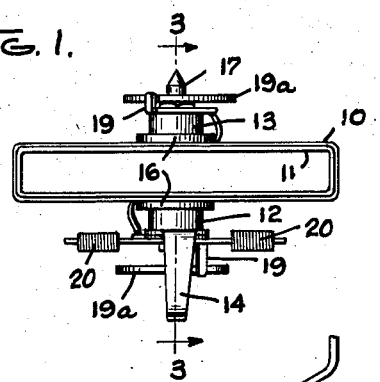
FIG. 1.
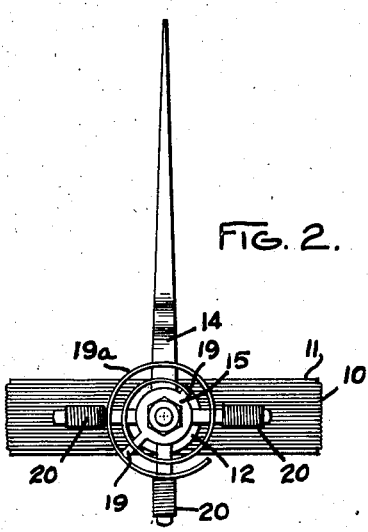
FIG. 2.
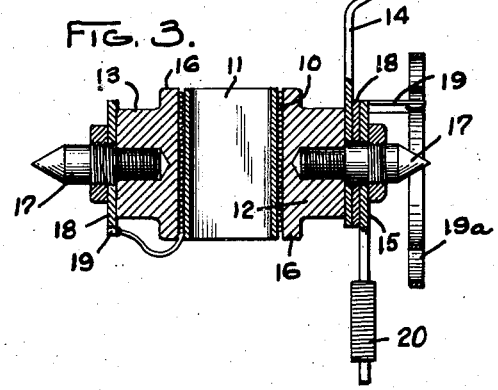
FIG. 3.
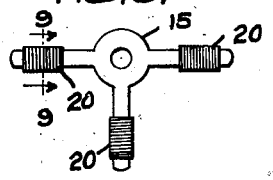
FIG. 5.
FIG. 5a.
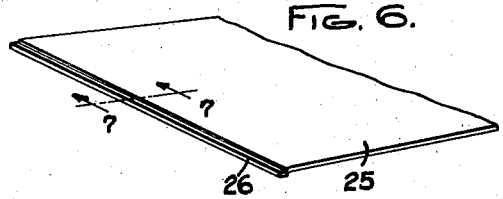
FIG. 6.
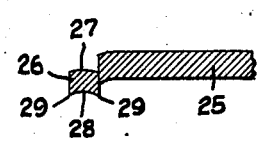
FIG. 7.
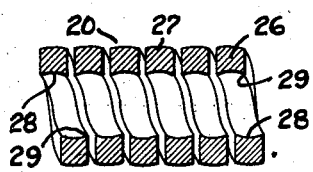
FIG. 8.
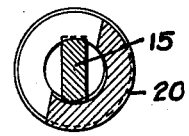
FIG. 4.
FIG. 9.
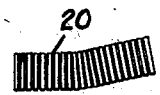
FIG. 10.
INVENTOR.
ROBERT D. HICKOK
BY
Hyde and Meyer
ATTORNEYS.

Patented Oct. 28, 1947

2,429,757

UNITED STATES PATENT OFFICE 2,429,757

BALANCING MEMBER FOR THE MOVING ELEMENT OF AN INDICATING INSTRUMENT

Robert D. Hickok, Bratenahl, Ohio, assignor to Cleveland Patents, Incorporated, a corporation of Ohio Application November 10, 1944, Serial No. 562,763

6 Claims. (Cl. 171—95)

This invention relates to balancing devices, such as are used to balance the rotating coil or other movable elements of delicate measuring instruments, such as electric meters or the like, and to the method of manufacture of such devices.

In such delicate instruments, it has long been customary to provide the moving element, such as the coil member, with one or more radial arms, on each of which is sleeved a very small helical coil made of wire of round cross section, the several coils being adjusted inwardly or outwardly along the arms to balance the total weight of all moving parts symmetrically about the central axis. The coils are of such size that when all turns are symmetrical with reference to the helix axis the coil may be readily applied to and adjusted upon the arm, but to provide friction to hold the coil in its final position it is slightly kinked or bent permanently laterally between its ends, and is then held in symmetrical or straight form between the jaws of a pair of forceps during application and adjustment. The arm of course is straight and holds the coil in that shape, but the tendency of the coil to resume its bent or kinked form provides a frictional holding effect.

The present invention aims to provide an improved balancing coil for the purpose stated, and an improved method of making it, which largely increase the resistance to movement when the coil has been applied to the arm, adjusted upon it and released.

More specifically, another object is to provide an improved balancing device which includes a coil of relatively hard wire so formed as to present to the arm on which it is mounted one or more relatively sharp edges serving as teeth to grip or dig into the softer material of the arm and thus resist movement of the coil, such as might occur as the result of shock or jar.

Still another object is to provide an improved method of forming such a coiled balancing device, which method, by ordinary steps, insures the provision of the necessary sharp edge or edges and the presentation thereof to the softer material of the arm.

Still another object is to provide an improved rotating meter element including balancing arms or members on which are mounted balancing coils made of wire of non-circular cross section and so coiled as to present inwardly, to the arm, one or more sharp gripping edges to resist coil movement on the arm.

Further objects of the invention in part are obvious and in part will appear more in detail hereinafter.

In the drawings,

Fig. 1 represents an elevation of one form of rotating meter element embodying or made according to the invention;

Fig. 2 is a plan view thereof;

Fig. 3 is a detail section, on a larger scale, on the line 3—3, Fig. 1;

Fig. 4 is a perspective view of the pointer;

Fig. 5 is a plan view of the balancing cross member;

Fig. 5a is a perspective view of the hair spring clip;

Fig. 6 is a perspective view illustrating the formation of a wire strip for use in making the balancing coil;

Fig. 7 is a detail section on a larger scale on the line 7—7, Fig. 6;

Fig. 8 is a longitudinal section through a coil;

Fig. 9 is a cross section, on a larger scale, on the line 9—9, Fig. 5; and

Fig. 10 is an elevation of the balancing coil.

While the invention is capable of use on or in connection with any rotating element, particularly of light weight, which it is desired to balance around its axis of rotation, it is more particularly adapted for use with delicate measuring instruments, such as electric meters, in which the rotating element, for example, may include a wire coil, together with electrical connections therefrom to the various circuits. Also, it may be employed upon or in connection with meter movements in which the rotating element has internal pivots, as in my Patent No. 2,355,649, granted August 15, 1944, for Electric meters, or with meters having external pivots, such as in my Patent No. 2,346,683, granted April 18, 1944, for Ratio meter, although here the rotating element includes but a single coil whereas the rotating element in said Patent No. 2,346,683 is of double coil form.

As illustrated, the rotating element includes a number of pieces or parts assembled as a unit and working together. These parts include a wire coil 10 wound upon the outside of a hollow rectangular form 11, made for example of thin sheet aluminum, and to the opposite parallel faces of which are secured upper and lower end blocks 12, 13, which are alike in all respects, except that one of the end blocks, such as the upper end block 12, includes a pointer member 14 and a cross arm member 15, which are unnecessary and are not included within the parts of the lower end block unit 13.

Except for that, each block includes a cylindrical base 16 suitably attached to the coil member, either internally or externally thereof, as by cement, and from which extends the pivot pin 17. Upon a reduced portion of the base 16 are sleeved, in order, the pointer 14, the cross arm 15, and the hair spring clip 18, each of which, it will be observed, includes a washer-like central portion from which one or more arms radiate. These parts are all made of thin, light material, such as aluminum, or an aluminum alloy, although the hair spring clip may be made of brass for soldering purposes. It has two opposite arms 19, to one of which an end of the wire coil is soldered, and to the other of which one end of the hair spring 19a is soldered.

The cross arm 15 and pointer 14 are shown as separate parts, although they may be integral and made of a single sheet of material. The cross arm is usually provided with three balancing arms spaced 90° apart. It is assembled with the pointer so that the pointer arm is opposite the middle one of the three balancing arms. Then the several parts of the rotating element are assembled and the members 14, 15 and 18 are secured in place in any suitable manner, as by a small nut, or a press fit washer, or by peening of the metal, or in any other suitable manner. The entire unit is next brought to balance, symmetrically around the central axis, by the application to one or several of the balancing arms of the cross arm member, of coils 20, and the adjustment of those coils to appropriate positions on their respective arms radially from the center.

According to the present invention, instead of making the wire coils 20 of wire of round cross section, as is usual, they are made of wire of noncircular cross section, with sharp edges, with the wire so coiled as to present inwardly, or toward the axis of the coil, one or more relatively sharp edges which, of course, extend helically along the entire coil. The arms on which the coils are mounted are of rectangular cross section, usually wider than they are deep, and they are made of relatively soft material, such as aluminum or an aluminum alloy. The material of which the wire is made is a considerably harder material, such as a phosphor bronze. Since it is difficult to form a truly square or other noncircular opening in a draw plate through which this wire may be drawn I prefer to manufacture the wire otherwise than by drawing, and particularly by a method which is readily adaptable to the very fine wire and small coil to be formed, to-wit, a coil in which both the wire diameter and the coil diameter are of the order of a few thousandths of an inch and the coil itself may have a total length of as little as .06 of an inch.

To that end, selecting a sheet of material 25, having a thickness approximating the diameter of the wire to be formed, I sever from a straight side edge of said sheet, by a simple shearing operation, a strip 26 having approximately the same width as the thickness of the sheet, so that the strip thus formed will be of generally square cross section. During the shearing operation, with material of the hardness of that here involved, the shearing operation produces an effect such as indicated generally in the exaggerated view, Fig. 7, with the sheared wire piece 26 having a generally slightly convex upper surface 27 and a slightly concave lower surface 28, providing two relatively sharp edges 29. When this wire strip is bent or turned into coil form, as shown in Fig. 8, care is taken to see to it that one or both sharp edges 29 of the material are presented inwardly or toward the axis. The coil is formed with an internal diameter approximating the maximum diagonal diameter of the arm on which the coil is mounted. Each coil is formed with its turns close together, to save room, and before each coil is applied to its arm, it is bent or kinked laterally, very slightly, between its ends. To apply the coil it is held in the clamping jaws of forceps, as is usual, so that the wire turns are in truly helical arrangement about a central axis. That enables the coil to be readily sleeved over an arm and adjusted upon it. But when the coil is released, in any adjusted position, its tendency to assume its bent or kinked form, on account of its inherent resiliency, causes the sharp edges of the hard wire to dig into and clasp the edges or corners of the softer material of the rectangular arm on which it is sleeved.

Careful measurements have shown that a balancing coil of this kind, but made of wire of round cross section, requires a force of approximately 1½ ounces to move it endwise upon the arm, whereas my improved coil of the same size and length, made of wire of non-circular cross section, according to my invention, requires a force of 4½ to 5 ounces to move it along the arm. Thus my improved coil offers considerably greater resistance to accidental displacement such as might occur as the result of the shock or jar of dropping an instrument or for any other cause.

Other advantages of the invention will be apparent to those skilled in the art.

What I claim is:

1. A balancing device of the construction and for the purposes described, comprising a generally helical wire coil formed of wire of noncircular cross section with the turns thereof arranged to present a relatively sharp edge inwardly toward the coils axis.

2. A balancing device of the construction and for the purposes described, comprising a generally helical wire coil formed of wire of noncircular cross section with the turns thereof arranged to a relatively sharp edge inwardly toward the coil axis, said wire being formed of relatively hard material, thereby enabling its sharp edge to bite into an arm made of softer material and upon which the coil may be sleeved.

3. A balancing device of the construction and for the purposes described, comprising a generally helical wire coil formed of wire of generally rectangular cross section and having at least two relatively sharp edges, the turns thereof being arranged to present at least one sharp edge inwardly toward the coil axis.

4. The method of making a balancing coil of the character described, consisting in shearing from an edge of a relatively thin sheet of a metal a strip whose width is approximately the same as the sheet thickness, thereby forming a wire strip of generally square cross section with two relatively sharp edges, and coiling said wire into generally helical form in a manner to present at least one of said sharp edges inwardly toward the coil axis.

5. The method of making a balancing coil of the character described, consisting in shearing from an edge of a relatively thin sheet of metal a strip whose width is approximately the same as the sheet thickness, such shearing operation depressing the metal on both sides of the plane of shear and thereby forming a wire strip of generally square cross section with two downwardly directed relatively sharp edge portions, and coiling said wire into generally helical form in such manner as to present at least one of said sharp edges inwardly toward the coil axis.

6. A balancing device of the construction and for the purposes described; comprising a generally helical wire coil formed of wire of noncircular cross section with the turns thereof arranged to present a relatively sharp edge inwardly toward the coil axis, the coil as a whole being bent laterally intermediate its ends, so that the axes of its opposite end portions are slightly askew with relation to each other, whereby when said coil is sleeved upon a rod its opposite end portions become aligned and the coil is held against movement on the rod both by the tendency of the coil as a whole to return to its bent form and of the turns of the coil to bite into the material of the rod.

ROBERT D. HICKOK.

REFERENCES CITED

The following references are of record in the file of this patent:

UNITED STATES PATENTS

| Number | Name | Date |
| --- | --- | --- |
| 611,723 | Weston | Oct. 4, 1898 |
| 2,346,572 | Goodwin | Apr. 11, 1944 |
| 2,312,990 | Miller | Mar. 2, 1943 |